(12) United States Patent (10) Patent No.: US 8,868,443 B2
Yankovich et al. (45) Date of Patent: Oct. 21, 2014

(54) TARGETED INCENTIVE ACTIONS BASED ON LOCATION AND INTENT

(75) Inventors: Steve Yankovich, San Jose, CA (US); Ryan Melcher, Ben Lomond, CA (US); Robert Dean Veres, Evanston, IL (US)

(73) Assignee: eBay Inc., San Jose, CA (US)

( * ) Notice: Subject to any disclaimer, the term of this patent is extended or adjusted under 35 U.S.C. 154(b) by 131 days.

(21) Appl. No.: 13/050,769

(22) Filed: Mar. 17, 2011

(65) Prior Publication Data

US 2012/0239501 A1 Sep. 20, 2012

(51) Int. Cl.
*G06Q 30/00* (2012.01)
*G06Q 30/02* (2012.01)

(52) U.S. Cl.
CPC .................... *G06Q 30/0235* (2013.01)
USPC ........................................ 705/14.1

(58) Field of Classification Search
CPC ....................................... G06Q 90/00
USPC ........................................ 705/14.1
See application file for complete search history.

(56) References Cited

U.S. PATENT DOCUMENTS

| | | | |
|---|---|---|---|
| 5,724,660 A | 3/1998 | Kauser et al. | |
| 5,732,354 A | 3/1998 | Macdonald | |
| 5,848,373 A | 12/1998 | DeLorme et al. | |
| 5,890,068 A | 3/1999 | Fattouche et al. | |
| 6,069,570 A | 5/2000 | Herring et al. | |
| 6,091,956 A | 7/2000 | Hollenberg | |
| 6,097,958 A | 8/2000 | Bergen | |
| 6,157,841 A | 12/2000 | Bolduc et al. | |
| 6,167,274 A | 12/2000 | Smith | |
| 6,198,927 B1 | 3/2001 | Wright et al. | |
| 6,204,812 B1 | 3/2001 | Fattouche | |
| 6,208,297 B1 | 3/2001 | Fattouche et al. | |
| 6,208,857 B1 | 3/2001 | Agre et al. | |
| 6,243,588 B1 | 6/2001 | Koorapaty et al. | |
| 6,246,861 B1 | 6/2001 | Messier et al. | |
| 6,246,882 B1 | 6/2001 | Lachance | |
| 6,259,923 B1 | 7/2001 | Lim et al. | |
| 6,266,014 B1 | 7/2001 | Fattouche et al. | |
| 6,314,365 B1 | 11/2001 | Smith | |
| 6,317,684 B1 | 11/2001 | Roeseler et al. | |
| 6,330,452 B1 | 12/2001 | Fattouche et al. | |
| 6,341,255 B1 | 1/2002 | Lapidot | |
| 6,356,543 B2 | 3/2002 | Hall et al. | |
| 6,404,388 B1 | 6/2002 | Sollenberger et al. | |
| 6,424,840 B1 | 7/2002 | Fitch et al. | |

(Continued)

OTHER PUBLICATIONS

"U.S. Appl. No. 11/140,273, Final Office Action mailed Jul. 15, 2009", 11 pgs.

(Continued)

*Primary Examiner* — Daniel Lastra
(74) *Attorney, Agent, or Firm* — Schwegman Lundberg & Woessner, P.A.

(57) ABSTRACT

A method and a system offer an incentive to a user of a mobile device based on a geographic location of the mobile device and the intent of the user. A processor-implemented location identification module determines the geographic location of the mobile device of the user. A processor-implemented item identification module identifies an item specified by the user at the geographic location of the mobile device. A processor-implemented incentive module offers an incentive from at least one merchant within a predefined distance based on the identified item and the geographic location of the mobile device.

30 Claims, 9 Drawing Sheets

(56) References Cited

U.S. PATENT DOCUMENTS

| | | | |
|---|---|---|---|
| 6,456,852 | B2 | 9/2002 | Bar et al. |
| 6,477,363 | B1 | 11/2002 | Ayoub et al. |
| 6,519,463 | B2 | 2/2003 | Tendler |
| 6,563,459 | B2 | 5/2003 | Takenaga |
| 6,577,946 | B2 | 6/2003 | Myr |
| 6,580,914 | B1 | 6/2003 | Smith |
| 6,590,533 | B2 | 7/2003 | Sollenberger et al. |
| 6,618,593 | B1 | 9/2003 | Drutman et al. |
| 6,690,322 | B2 | 2/2004 | Shamoto et al. |
| 6,714,797 | B1 | 3/2004 | Rautila |
| 7,092,702 | B2 | 8/2006 | Cronin et al. |
| 7,130,622 | B2 | 10/2006 | Vänskä et al. |
| 7,254,388 | B2 | 8/2007 | Nam et al. |
| 7,848,765 | B2 | 12/2010 | Phillips et al. |
| 2001/0055976 | A1 | 12/2001 | Couch et al. |
| 2002/0143930 | A1 | 10/2002 | Babu et al. |
| 2002/0145984 | A1 | 10/2002 | Babu et al. |
| 2003/0004802 | A1 | 1/2003 | Callegari |
| 2003/0125043 | A1 | 7/2003 | Silvester et al. |
| 2003/0126150 | A1 | 7/2003 | Chan et al. |
| 2003/0130787 | A1 | 7/2003 | Clapper |
| 2003/0139190 | A1 | 7/2003 | Steelberg et al. |
| 2003/0216960 | A1 | 11/2003 | Postrel |
| 2003/0220835 | A1 | 11/2003 | Barnes, Jr. |
| 2004/0002359 | A1 | 1/2004 | Deas et al. |
| 2004/0021567 | A1 | 2/2004 | Dunn |
| 2004/0043773 | A1 | 3/2004 | Lee et al. |
| 2004/0192339 | A1 | 9/2004 | Wilson et al. |
| 2004/0192349 | A1 | 9/2004 | Reilly |
| 2004/0203901 | A1 | 10/2004 | Wilson et al. |
| 2004/0203931 | A1 | 10/2004 | Karaoguz |
| 2005/0159883 | A1 | 7/2005 | Humphries |
| 2005/0250516 | A1 | 11/2005 | Shim |
| 2006/0047825 | A1 | 3/2006 | Steenstra et al. |
| 2006/0064346 | A1 | 3/2006 | Steenstra et al. |
| 2006/0099959 | A1 | 5/2006 | Staton et al. |
| 2006/0145837 | A1 | 7/2006 | Horton et al. |
| 2006/0236257 | A1 | 10/2006 | Othmer et al. |
| 2006/0270421 | A1 | 11/2006 | Phillips et al. |
| 2007/0024469 | A1 | 2/2007 | Chou |
| 2007/0202844 | A1 | 8/2007 | Wilson et al. |
| 2008/0248815 | A1* | 10/2008 | Busch ......................... 455/456.5 |
| 2009/0076925 | A1 | 3/2009 | Dewitt et al. |
| 2012/0126974 | A1 | 5/2012 | Phillips et al. |
| 2012/0239483 | A1 | 9/2012 | Yankovich et al. |

OTHER PUBLICATIONS

"U.S. Appl. No. 11/140,273, Final Office Action mailed Dec. 13, 2007", 11 pgs.

"U.S. Appl. No. 11/140,273, Non Final Office Action mailed Feb. 26, 2010", 11 pgs.

"U.S. Appl. No. 11/140,273, Non Final Office Action mailed May 31, 2007", 10 pgs.

"U.S. Appl. No. 11/140,273, Non Final Office Action mailed Jul. 3, 2008", 11 pgs.

"U.S. Appl. No. 11/140,273, Notice of Allowance mailed Aug. 3, 2010", 6 pgs.

"U.S. Appl. No. 11/140,273, Preliminary Amendment mailed Aug. 30, 2005", 32 pgs.

"U.S. Appl. No. 11/140,273, Response filed Mar. 20, 2007 to Restriction Requirement mailed Feb. 21, 2007", 10 pgs.

"U.S. Appl. No. 11/140,273, Response filed Apr. 14, 2008 to Final Office Action mailed Dec. 13, 2007", 13 pgs.

"U.S. Appl. No. 11/140,273, Response filed Apr. 21, 2009 to Restriction Requirement mailed Jan. 21, 2009", 10 pgs.

"U.S. Appl. No. 11/140,273, Response filed May 26, 2010 to Non Final Office Action mailed Feb. 26, 2010", 13 pgs.

"U.S. Appl. No. 11/140,273, Response filed May 27, 2007 to Final Office Action mailed Dec. 13, 2007", 18 pgs.

"U.S. Appl. No. 11/140,273, Response filed Oct. 7, 2008 to Non Final Office Action mailed Jul. 3, 2008", 17 pgs.

"U.S. Appl. No. 11/140,273, Response filed Nov. 16, 2009 to Non Final Office Action mailed Jul. 15, 2009", 19 pgs.

"U.S. Appl. No. 11/140,273, Response filed Nov. 27, 2007 to Non Final Office Action mailed May 31, 2007", 12 pgs.

"U.S. Appl. No. 11/140,273, Restriction Requirement mailed Jan. 21, 2009", 6 pgs.

"U.S. Appl. No. 11/140,273, Restriction Requirement mailed Feb. 21, 2007", 5 pgs.

"Halfbakery: Buddy Locator", [Online]. Retrieved from the Internet: <URL: http://www.halfbakery.com/idea/Buddy_20Locator#1055455737>, (Jun. 11, 2003).

"Halfbakery: Mobile Proximity Link", [Online]. Retrieved from the Internet: <URL: http://www.halfbakery.com/idea/Mobile_20Proximity_20Link#1001923289>, (Sep. 30, 2001).

"Halfbakery: Mobile phone utility", [Online]. Retrieved from the Internet: <URL: http://www.halfbakery.com/idea/mobile_20phone_20utility#1073585857>, (Jan. 8, 2004).

"Networks in Motion Named Semi-Finalist for Wireless LBS Challenge", [Online]. Retrieved from the Internet: <URL: http://tmcnet.com/usubmit/2004/Mar/1025200.htm>, (Mar. 18, 2004).

"SignalSoft Corporation awarded location-based services patent", [Online]. Retrieved from the Internet: <URL: http://www.cellular.co.za/news_2001/04282001-signalsoft-patent.htm>, (Apr. 27, 2001).

"U.S. Appl. No. 13/339,235, Response filed Jun. 15, 2012 to Non Final Office Action mailed Mar. 16, 2012", 11 pgs.

"U.S. Appl. No. 13/339,235, Response filed Nov. 29, 2012 to Final Office Action mailed Aug. 29, 2012", 11 pgs.

"U.S. Appl. No. 13/339,235, Final Office Action mailed Aug. 29, 2012", 11 pgs.

"U.S. Appl. No. 13/339,235, Non Final Office Action mailed Mar. 16, 2012", 10 pgs.

"Proposal for free, open source cell phone location service", 90% Crud, [Online]. Retrieved from the Internet: <URL: http://george.hotelling.net/90percent/geekery/proposal_for_free_open_source_cell_phone_location_service.php>, (Mar. 6, 2004), 1 pg.

Yankovich, Steve, et al., "Targeted Incentive Actions Based on Location and Intent", U.S. Appl. No. 13/050,769, filed Mar. 17, 2011, 47 pgs.

"U.S. Appl. No. 13/339,235, Notice of Allowance mailed Apr. 25, 2014", 8 pgs.

"U.S. Appl. No. 13/361,113, Non Final Office Action mailed Feb. 13, 2014", 13 pgs.

"U.S. Appl. No. 13/361,113, Response filed May 13, 2014 to Non Final Office Action mailed Feb. 13, 2014", 13 pgs.

* cited by examiner

| | |
|---|---|
| MERCHANT NAME 602 | JOE'S ELECTRONICS |
| ITEM NAME 604 | XYZ S100 DIGITAL CAMERA |
| BRAND NAME 606 | XYZ |
| MODEL NAME 608 | S100 |
| CATEGORY TAG 610 | PERSONAL ELECTRONICS |
| SUB-CATEGORY TAG 612 | DIGITAL CAMERA |
| INCENTIVE 614 | 40% OFF MSRP |
| INCENTIVE TERMS 618 | LIMIT ONE, VALID TODAY ONLY |

TARGETED INCENTIVE ACTIONS BASED ON LOCATION AND INTENT

TECHNICAL FIELD

This application relates to a method and system for determining targeted incentives based on a user location and activity.

BACKGROUND

With the advent of sophisticated mobile devices, users have instant access to information when shopping for items. For example, a user may be able to look up pricing information on his/her mobile device while noticing the item of interest at a retail store. The mobile device may access a pricing comparison website that asks the user to enter the information on the item of interest. Pricing comparison websites typically use a search engine to collect pricing information from random online retailers. Unfortunately, the pricing information conveyed to the user on the mobile device only includes the price of the item sold at a corresponding merchant and does not include additional details and information that may be of interest to the user.

BRIEF DESCRIPTION OF THE DRAWINGS

The present invention is illustrated by way of example, and not by way of limitation, in the figures of the accompanying drawings in which:

FIG. 6 is a block diagram illustrating an example of attributes of a data structure for an incentive;

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system offer an incentive to a user of a mobile device based on a geographic location of the mobile device and the intent of the user. The geographic location of the mobile device is determined. The item specified by the user at the geographic location of the mobile device is determined. Incentives from local merchants are presented to the user based on the identified item and the geographic location of the mobile device. Incentives include and are not limited to promotions, discounts, sales, rebates, coupons. In another embodiment, the incentive may also include item recommendations.

Figure 1:
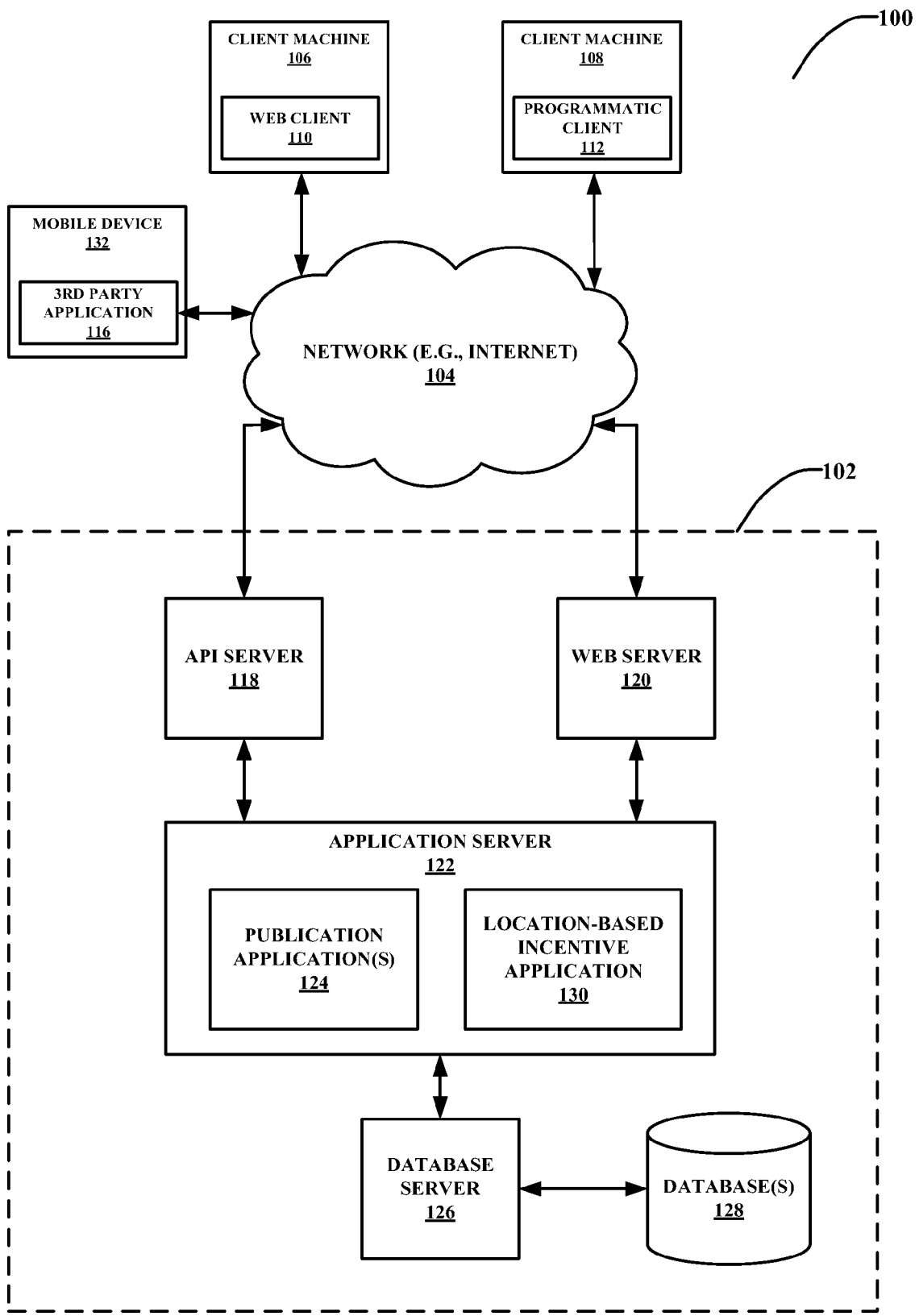
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include, but are not limited to, content and user data such as feedback data; user reputation values; user profiles; user attributes; product and service reviews and information, such as pricing and descriptive information; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132 may also be in communication with the network-based publisher 102 via a web server 120. The mobile device 132 may include a portable electronic device providing at least some of the functionalities of the client machines 106 and 108. The mobile device 132 may include a third party application 116 (or a web client) configured communicate with application server 122.

Turning specifically to the network-based publisher 102, an application program interface (API) server 118 and a web server 120 are coupled to, and provide programmatic and web interfaces respectively to, one or more application servers 122. The application servers 122 host one or more publication application (s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

A publication application(s) 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The network-based publisher 102 may provide a multitude of feedback, reputation, aggregation, and listing and price-setting mechanisms whereby a user may be a seller or buyer who lists or buys goods and/or services (e.g., for sale) published on the network-based publisher 102.

The application server 122 also includes a location-based incentive application 130. The location-based incentive application 130 communicates incentives to the mobile device 132 based on the mobile device 132 location and the intent of the user of the mobile device 132 as further described below.

Figure 2:
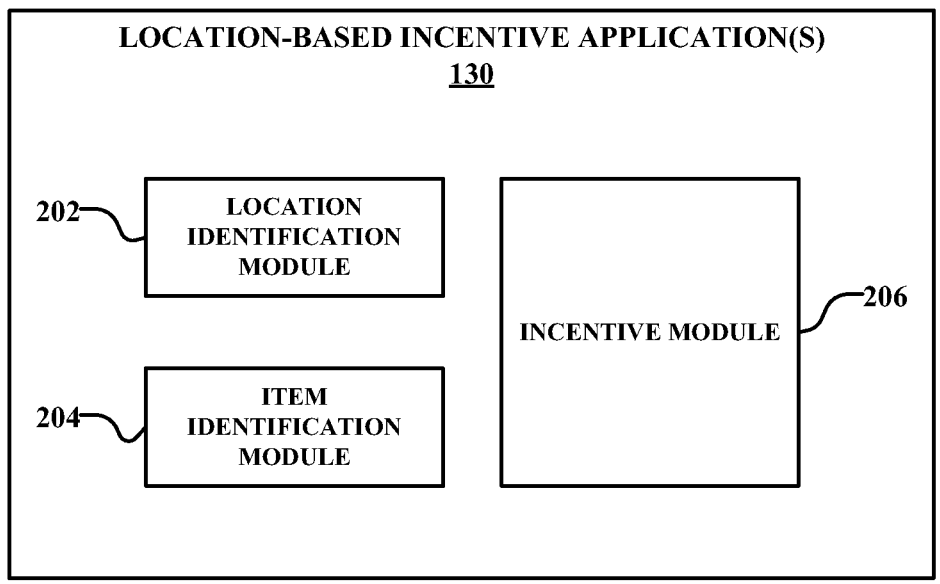
FIG. 2 is a block diagram illustrating an example embodiment of a location-based incentive application.

FIG. 2 is a block diagram illustrating an example embodiment of a location-based incentive application 130, which is provided as part of the network-based publisher 102. The location-based incentive application 130 has a location identification module 202, an item identification module 204, and an incentive module 206. The location identification module 202 determines a geographic location of the mobile device 132. The item identification module 204 identifies an item specified by the user at the geographic location of the mobile device 132. The incentive module 206 communicates an incentive from one or more local merchants based on the identified item and the geographic location of the mobile device 132. These modules may be implemented in hardware, firmware, or any combination thereof.

In one embodiment, the location-based incentive application 130 receives a communication from the mobile device 132. For example, the communication may include a specification of an item and a location of the mobile device 132. Based on the specified item and the location of the mobile device 132, the incentive module 206 consults with the database server 126 and database 128 to determine and communicate incentives from local merchants to the mobile device 132.

Figure 3:
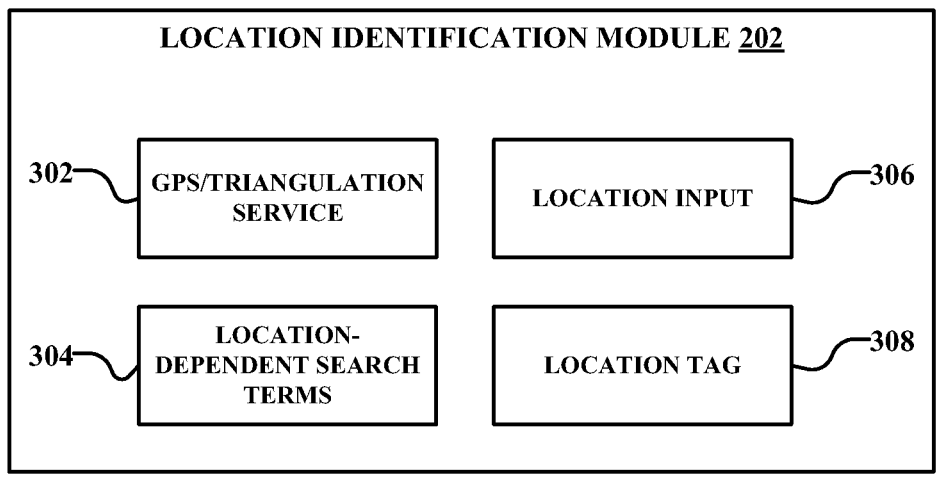
FIG. 3 is a block diagram illustrating an example embodiment of a location identification module.

FIG. 3 is a block diagram illustrating an example embodiment of the location identification module 202. The location of the mobile device 132 can be determined in many ways. For example, the mobile device 132 may be equipped with a Global Positioning Service (GPS) system that would allow the device to communicate the coordinates or location of the mobile device 132 to a GPS/triangulation module 302 of the location identification module 202. In another example, the location of the mobile device 132 may be determined by triangulation using wireless communication towers and/or wireless nodes (e.g. wi-fi hotspots) within wireless signal reach of the mobile device 132. Based on the geographic coordinates, the GPS/triangulation module 302 of the location identification module 202 can determine the geographic location of the mobile device 132 after consulting a mapping database (not shown). Furthermore, the general location of the mobile device 132 can be located when the user of the mobile device 132 logs onto a local internet connection, for example, at a hotel or coffee shop. The Internet Protocol address of the network connection at the hotel uniquely identified by the location of the hotel.

The location identification module 202 may also include a location input module 306 configured to determine a geographic location of the mobile device 132 by requesting the user to input an address, city, zip code or other location information on his/her mobile device 132. In one embodiment, the user can select a location from a list of locations or a map on the mobile device 132. For example, a user on the mobile device 132 inputs the location of the mobile device 132 via an application or a web browser on the mobile device 132. In another embodiment, the location input module 306 derives the geographic location of the user by communicating with third party application using respective APIs (Application Programming Interface).

The location identification module 202 may also include a location-dependent search term module 304. The location of the mobile device 132 can be inferred when the user of the mobile device 132 requests a search on the mobile device 132 using location-dependent search terms. For example, a user inputs a search query on his/her mobile device for "Best Japanese Restaurant San Jose." The location-dependent search term module 304 consults a database (not shown) that can determine the geographic location of the best Japanese restaurant in San Jose. The location-dependent search term module 304 then infers that the user of the mobile device 132 is at that geographic location. In one embodiment, the location-dependent search term module detects the search query term "San Jose" as a location and infers that the location of the user is in San Jose irrespective of actually running the search.

The location identification module 202 may also include a tag module 308 configured to determine the geographic location of the mobile device 132 based on a tag associated with a unique geographic location. The tag may include, for example, a barcode tag (e.g. linear barcode or two dimensional bar code) or a Radio Frequency Identification (RFID) tag that is associated with a unique geographic location. For example, the user of the mobile device 132 may use his/her mobile device 132 to scan the tag placed at a landmark or store. The tag is uniquely associated with the geographic location of the landmark or store. Such relationship can be stored in a database. The tag module 308 can then determine the geographic location of the mobile device 132 based on the tag after consulting the database.

Figure 4:
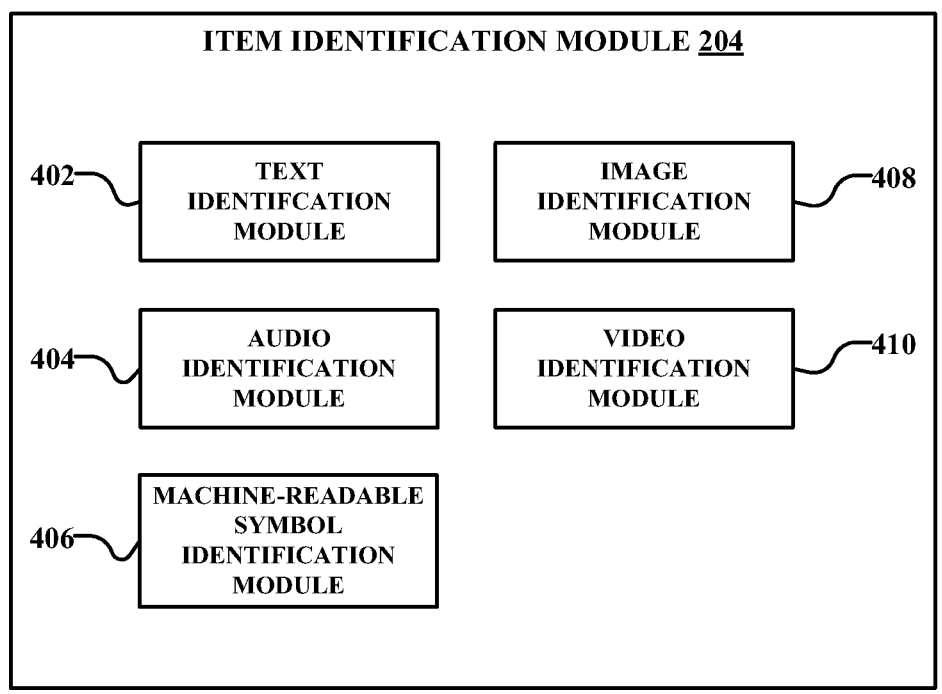
FIG. 4 is a block diagram illustrating an example embodiment of an item identification module.

FIG. 4 is a block diagram illustrating an example embodiment of an item identification module 204. The item specified by the user of the mobile device 132 can be determined in many ways using any of the following examples of modules:

a text identification module 402, an audio identification module 404, a machine-readable symbol module 406, an image identification module 408, and a video identification module 410.

The text identification module 402 identifies an item or a category of an item specified by the user at the mobile device 132 using a text input from the user at the mobile device 132. For example, the user may enter the brand and model number of an item the user wishes to search for at the location of the mobile device 132. The text identification module 402 can then identify the item by comparing the brand and model number of the item with a database containing a catalog of products. In another embodiment, the user can input a category of the item. For example, the user may be interested in not a specific digital camera but any brand of digital camera. As such the user may specify "digital camera" as a category for searching. The text identification module 402 can then identify items that correspond to the text input by the user. In this case, the text identification module 402 identifies items that match the category of the item input by the user (e.g. all digital cameras).

In another embodiment, the user can enter the barcode or any other types of codes associated with an item. The text identification module 402 can then identify the item by comparing the barcode with a database containing a catalog of products and their corresponding barcodes.

The audio identification module 404 identifies an item or a category of the item as specified by the user at the mobile device using an audio input from the user at the mobile device. For example, the user may speak the brand name and model of an item the user wishes to search for at the location of the mobile device. The audio identification module 404 includes a speech recognition system (not shown) that enables the spoken words of the user to be transcribed into text. In another embodiment, the audio identification module 404 includes a song recognition system (not shown) that recognizes the title and author of the song.

The audio identification module 404 then can be used to identify the specified item by comparing the brand and model number of the item transcribed from the audio with a database containing a catalog of products. In another embodiment, the user can speak a category of the item. For example, the user may be interested in not a specific digital camera but any brand of digital camera. As such the user may say "digital camera" to the mobile device as a category for searching. The audio identification module 402 can then identify items that correspond to the audio input by the user. In this case, the text identification module 402 identifies items that match the category of the item as spoken by the user (e.g. "digital camera").

The machine-readable symbol module 406 identifies an item by having the user scan the bar code or any other machine-readable symbol with his/her mobile device 132 as a machine-readable symbol reader. For example, the mobile device 132 may include an optical device (e.g. a lens) configured to capture an image of a bar code on an item or product. The mobile device 132 may then upload the captured image to the machine-readable symbol module 406. The machine-readable symbol module 406 processes the machine-readable symbol by consulting a database of machine-readable symbols to match the machine-readable symbol with a corresponding item or product. The machine-readable symbol module 406 can then identify the item specified by the user at the mobile device. Based on the identified item, the machine-readable symbol module 406 can further determine attributes associated with the item. For example, the machine-readable symbol module 406 can determine the category, brand, and other product related or similar to the identified item. Other identifying and descriptive information related to the identified item may be returned by the machine-readable symbol module 406 as well.

The image identification module 408 identifies an item by having the user take a picture of the item with his/her mobile device 132. Mobile devices commonly have an optical lens for capturing pictures. The mobile device 132 may then upload the picture to the image identification module 408. The image identification module 408 analyzes the picture using an image recognition algorithm (not shown) to match the uploaded picture with a corresponding image of an item. The image recognition algorithm consults a database of images and corresponding items to identify the uploaded picture. For example, a user may take a picture of a shoe with his/her mobile device 132. The image identification module 408 recognizes the shoe and identifies its brand and model, among other identifying and descriptive information about the item. In another example, the user may take a picture of a barcode or other item identifier. The image identification module 408 may recognize and decode the barcode contained in the image and identify the brand and model. In certain instances, the image identification module 408 may operate in conjunction with one or more other modules, such as the machine-readable symbol module 406 to perform image recognition and identification. In another embodiment, the image identification module 408 can also determine other products related or similar to the identified item.

The video identification module 410 is configured to identify an item by having the user take a video of the item with his/her mobile device. Mobile devices commonly have an optical lens to capture video. The mobile device 132 may then upload the video (or a portion of the video) to the video identification module 408. The video identification module 410 analyzes the frames of the video using an image recognition algorithm (not shown) to match a frame of the video with a corresponding image of an item. The image recognition algorithm consults a database of images and corresponding items to identify the uploaded video. For example, a user may take a video with his/her mobile device of a shoe worn by someone walking. The video identification module 410 recognizes the shoe and identifies its brand and model, among other identifying and descriptive information about the item. In another embodiment, the video identification module 410 can also determine other products related or similar to the identified item.

Figure 5:
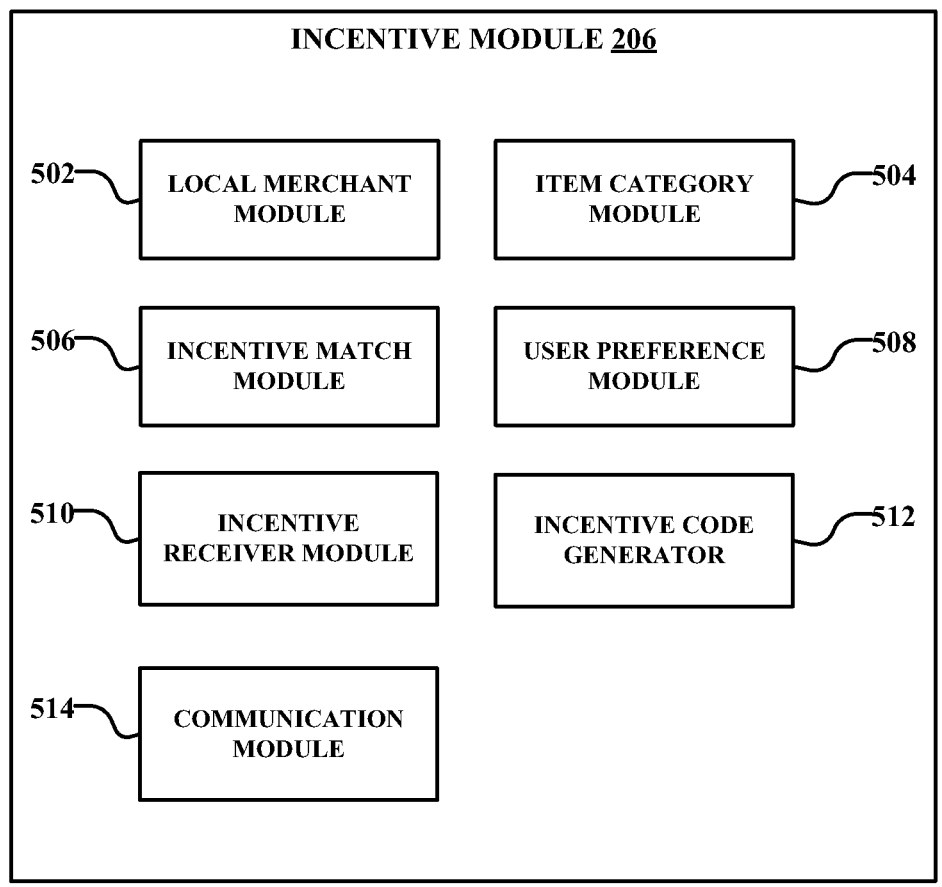
FIG. 5 is a block diagram illustrating an example embodiment of an incentive module.

FIG. 5 is a block diagram illustrating an example embodiment of the incentive module 206 that may used to execute the processes described herein. The incentive module 206 includes a local merchant module 502, an item category module 504, an incentive matching module 506, a user preference module 508, an incentive receiver module 510, an incentive code generator module 512, and a communication module 514.

The local merchant module 502 identifies at least one local merchant having at least one incentive based on the geographic location of the mobile device 132 as determined by the location identification module 202. A local merchant may be a merchant or retailer that is located within a predefined distance from the geographic location of the mobile device 132. In one embodiment, the local merchant module 502 identifies at least one local merchant with at least one incentive based on an updated search distance preference as specified in the user preference module 508.

It should be noted that the incentive of the local merchant may or may not correspond to the item identified by the user. For example, a local merchant may feature a special sale on shoes while identified item corresponds to a digital camera.

Once all local merchants having incentives are identified based on the geographic location of the mobile device 132 (using a database of incentives), the incentive match module 506 filters all local merchants based on the identified item. In the previous example, the local merchant featuring a sale on shoes may be filtered out from the search result.

The item category module 504 determines a category of the item specified by the user and identified by item identification module 204. For example, the user may specify a particular digital camera. The item category module 504 determines that the item specified by the user falls into the category of electronics and the subcategory of cameras.

The incentive match module 506 determines whether the identified item specified by the user corresponds to an item identified in at least one incentive of at least one local merchant as determined by the local merchant module 502. For example, a user specifies an item with his/her mobile device. The item is identified as a specific digital camera. The item identification module 204 generates the brand, model number, color, and other attributes of the specified digital camera. The local merchant module 502 identifies merchants with incentives local to the geographic location of the mobile device 132. The incentive match module 506 matches local merchants with incentives (sale or discount) on the specific digital camera.

In another embodiment, the incentive match module 506 determines whether the category of the item identified by the user corresponds to a category of items as determined by item category module 504 and identified in at least one incentive of at least one local merchant. For example, a user specifies an item with his/her mobile device 132. The item is identified as a specific digital camera. The item identification module 204 generates the brand, model number, color, and other attributes of the specified digital camera. The item category module 504 determines the category of the identified item: electronics. The local merchant module 502 identifies merchants with incentives local to the geographic location of the mobile device 132. The incentive match module 506 matches local merchants with incentives (sale or discount) on electronics or categories related to the digital camera.

The user preference module 508 provides user-defined preferences used in the process of determining local merchants or brands or category of the items. In one embodiment, the user preference module 508 allows a user to update a search distance preference for local merchants. For example, the user may wish to decrease the radius of the distance preference in a downtown area of a city. Conversely, the user may wish to increase the radius of the distance preference in a suburban or rural area of a city. In another embodiment, user preference module 508 may also allow the user to specify favorite brands of items or favorite merchants or retailers.

The incentive code module 512 generates a code associated with at least one incentive selected by the user at the mobile device 132. The code may be valid for a predetermined period of time at the corresponding local merchant. For example, a user selects a coupon from a local merchant on his/her mobile device 132. The incentive code module 512 generates a code associated with the coupon. The code is communicated to the mobile device 132 of the user. The user takes the code to the corresponding local merchant to redeem the discount. The code can be redeemed at the local merchant by showing or telling the code to a cashier at the checkout register of the local merchant. The cashier may then enter the code at the checkout register to determine the validity of the code and appropriately apply the discount or promotion. The code can also be redeemed by displaying a machine-readable code such as a bar code on a screen of the mobile device 132. The user then displays the bar code to the cashier at the checkout register who can scan the bar code to determine the validity of the code and appropriately apply the discount or promotion.

In one embodiment, the code may be valid for a predetermined period of time (e.g. one day, one week, etc. . . . ). In another embodiment, the generated code may be uniquely associated with the user of the mobile device 132 and may expire immediately upon redeeming the coupon.

The communication module 514 communicates one or more incentives of the identified item from at least one local merchant to the mobile device 132. For example, a list of local merchants within a preset distance radius (e.g. one mile) of the mobile device 132 is displayed. The list of local merchants may include a sale or discount on the item identified by the user of the mobile device 132. The list may also include a list of recommended merchants (having an incentive on the identified item) that are located beyond the preset distance radius.

In another embodiment, the communication module 514 communicates one or more incentives of the identified category of the items from at least one local merchant to the mobile device 132. For example, a list of local merchants within a preset distance radius (e.g. a block) of the mobile device 132 is displayed. The list of local merchants may include a sale or discount on similar or related items to the identified item specified by the user of the mobile device 132. The list may also include a list of recommended merchants (having an incentive on similar items to the identified item) that are located beyond the preset distance radius.

The incentive receiver module 510 collects attributes of incentives from merchants and stores the attributes of the incentives in an incentive database. An example of a data structure of the incentive database is further described in FIG. 6.

FIG. 6 is a block diagram illustrating attributes of an example of a data structure of an incentive. In one embodiment, the data structure of the incentive database includes attributes of the incentives for an item. For example, the attributes include a name attribute of the merchant 602, a name attribute of the item 604, a brand attribute of the item 606, a model attribute of the item 608, a category tag of the item 610, a sub-category tag of the item 612, a financial promotion attribute of the item 614, and a financial promotion term attribute of the item 616.

The merchant name attribute 602 includes the name of the local merchant (e.g. Joe's Electronic Shop). The item name attribute 604 includes the name of an item (e.g. digital camera XYZ D001). The brand attribute 606 includes the brand name of the item (e.g. brand XYZ). The model attribute 608 includes the model number of the item (e.g. D001). The category tag 610 includes a category metadata associated with the item (e.g. personal electronics). The sub-category tag 612 includes a sub-category metadata associated with the item (e.g. digital camera). The financial promotion attribute 614 includes the sale or discount associated with the item (e.g. 40% all digital cameras, or 20% all brand XYZ digital cameras). The financial promotion term 616 includes the terms of the sale or discount associated with the item (e.g. discount expires on xx/xx/xxxx, discount expires one week from today, or discount valid today only).

Figure 7A:
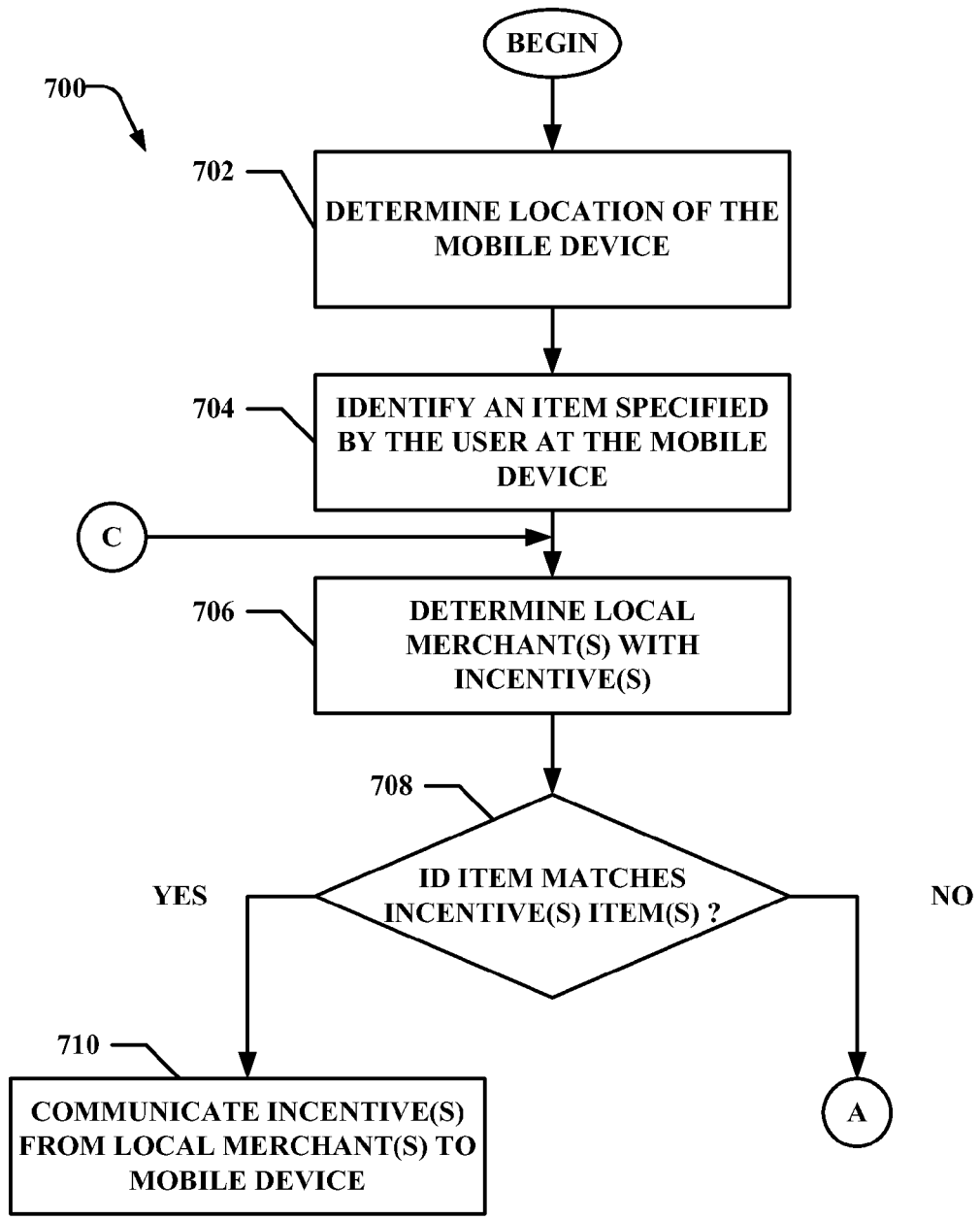
FIG. 7A is a flow chart of an example method for identifying a targeted incentive.

FIG. 7A is a flow chart of an example method for identifying a targeted incentive. At 702, the location identification module 202 of the location-based incentive application 130 determines the geographic location of a mobile device of a user. At 704, the item identification module 204 of the location-based incentive application 130 identifies an item specified by the user at the geographic location of the mobile device 132. At 706, the local merchant module 502 of the incentive module 206 determines local merchants to the geographic location of the mobile device 132 with at least one incentive. At 708, the incentive match module 506 of the incentive module 206 of the location-based incentive application 130 determines whether the identified item as specified by the user corresponds to an item identified in at least one incentive of the local merchants as determined at operation 706. At 710, the communication module 514 of the incentive module 206 of the location-based incentive application 130 communicates a list of local merchants with incentives for the identified item to the mobile device 132.

Figure 7B:
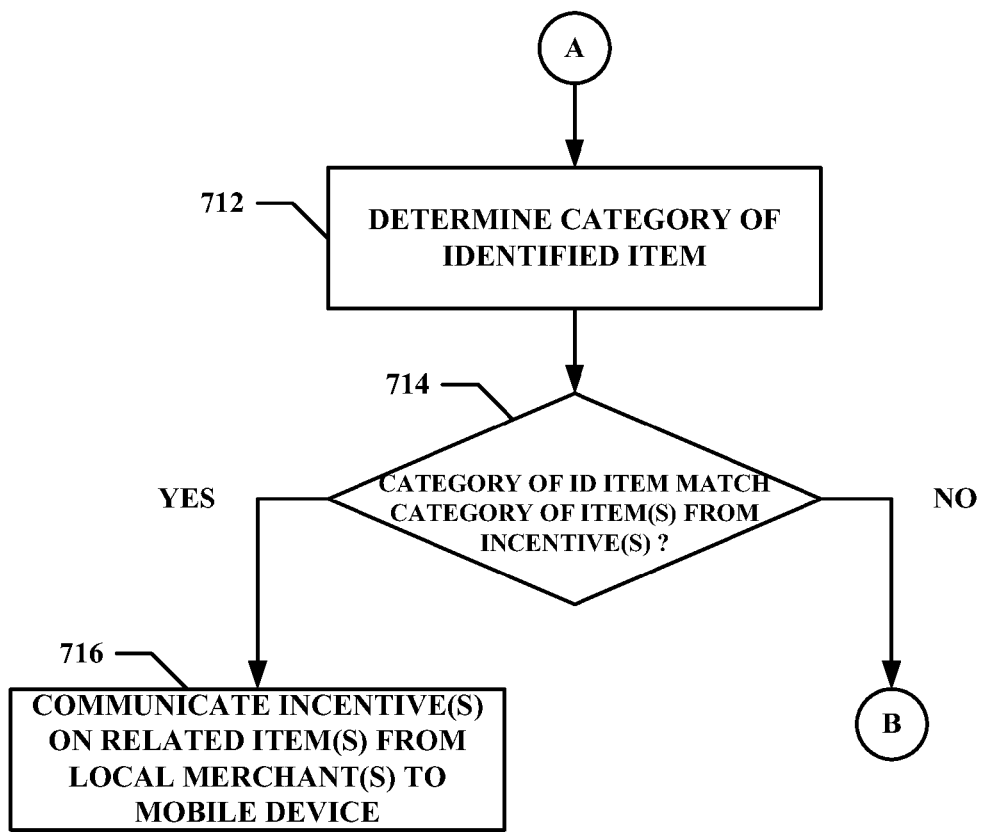
FIG. 7B is a flow chart of another example method for identifying a targeted incentive.

FIG. 7B is a flow chart of another example method for identifying a targeted incentive. At 712, if there are no local merchants having incentives on the identified item, the item category module 504 of the incentive module 206 of the location-based incentive application 130 determines a category of the identified item. At 714, the incentive match module 506 of the incentive module 206 of the location-based incentive application 130 determines whether a category of the identified item as specified by the user corresponds to a category of items identified in at least one incentive of the local merchants as determined at operation 706. At 716, the communication module 514 of the incentive module 206 of the location-based incentive application 130 communicates a list of local merchants with incentives on similar or related items from the same category of the identified item to the mobile device 132.

Figure 7C:
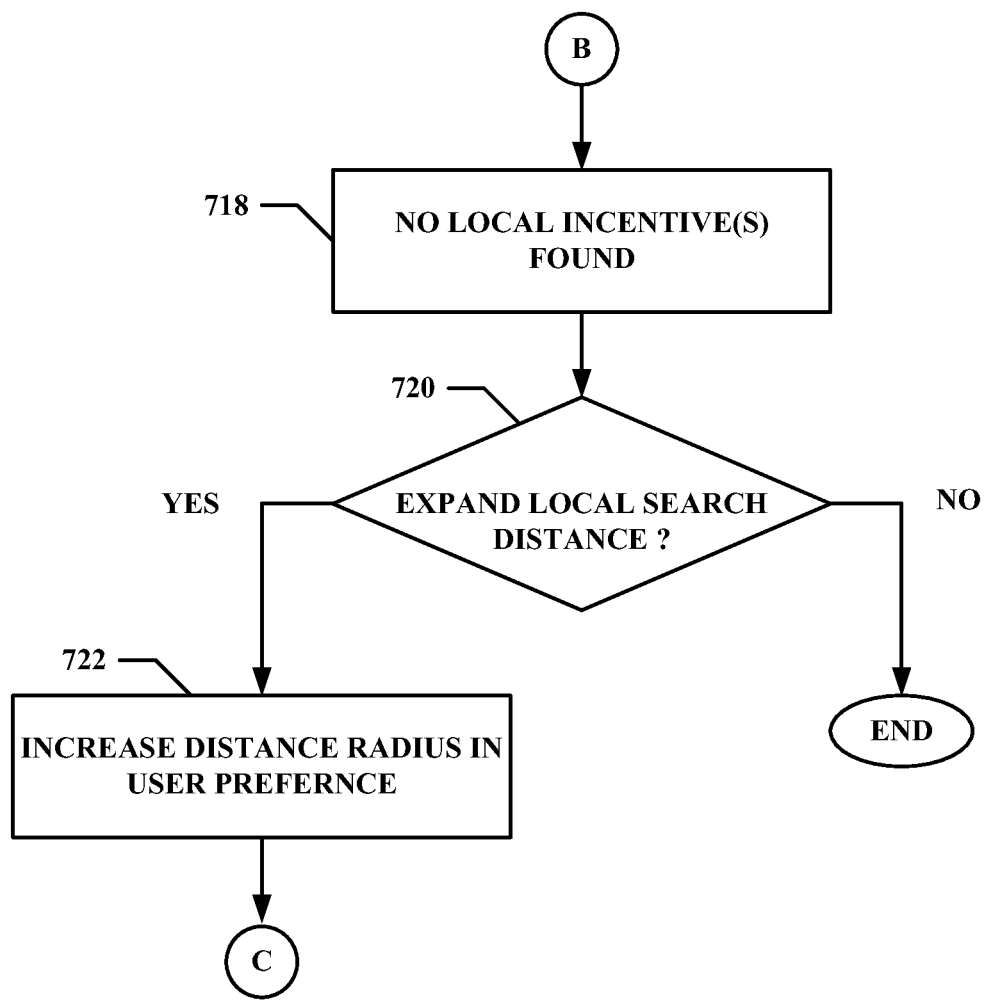
FIG. 7C is a flow chart of an example method for expanding a search of local incentives.

FIG. 7C is a flow chart of an example method for expanding a search of local incentives. At 718, the communication module 514 of the incentive module 206 of the location-based incentive application 130 communicates that the incentive match module 506 of the incentive module 206 of the location-based incentive application 130 cannot find any incentives from local merchants related to the identified item to the mobile device 132. At 720, the incentive module 206 may offer the user to expand or increase the distance radius preference for local merchants in the user preference module 508. At 722, the user preference module 508 may be updated to reflect a new distance radius preference when searching for local merchants with incentives.

Figure 8:
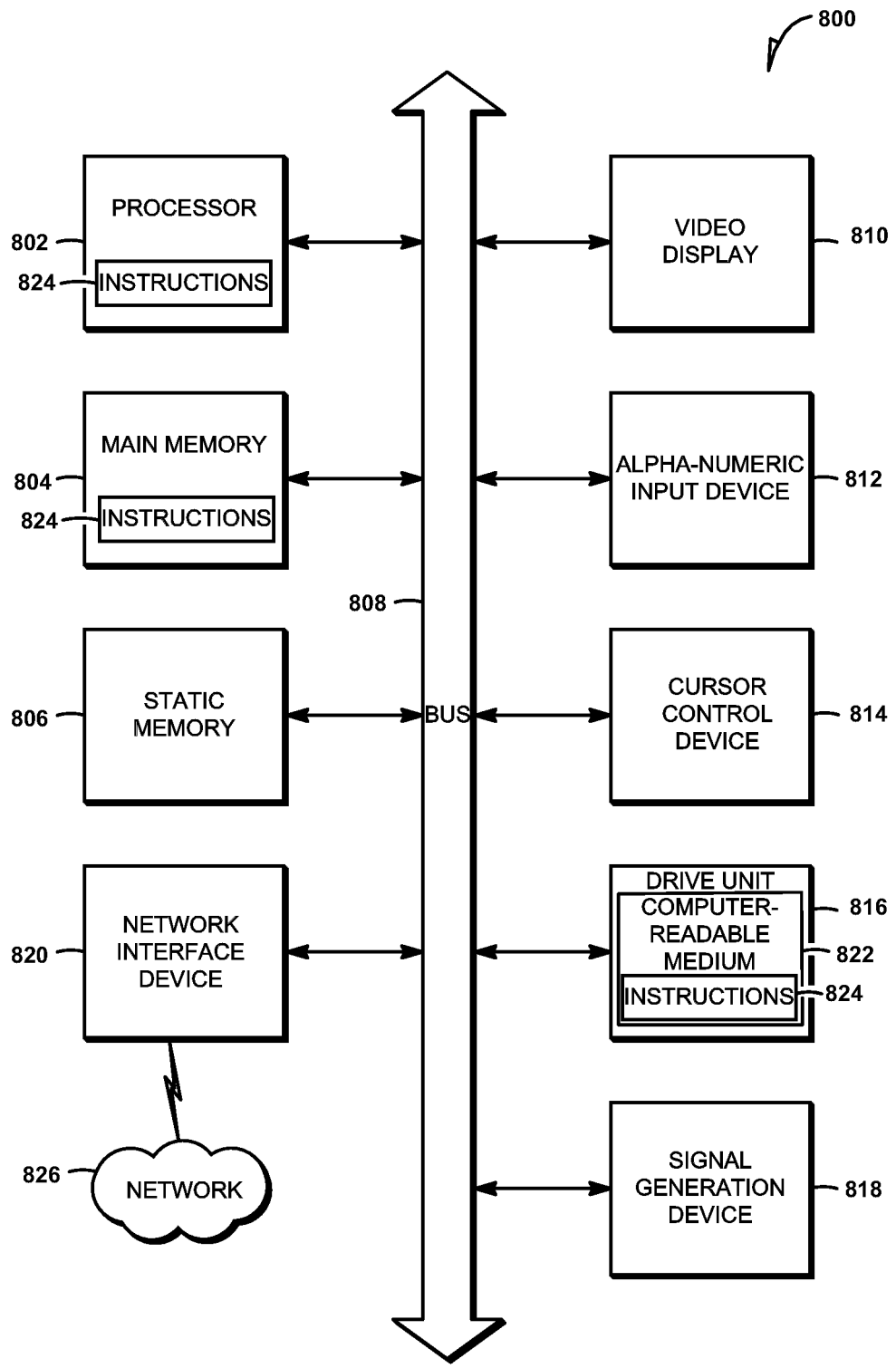
FIG. 8 shows a diagrammatic representation of machine in the example form of a computer system within which a set of instructions may be executed to cause the machine to perform any one or more of the methodologies discussed herein.

FIG. 8 shows a diagrammatic representation of machine in the example form of a computer system 800 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
a processor-implemented location identification module configured to
receive, from a mobile device of a user, a communication that includes a picture of an item and data that pertains to a location of the mobile device of the user, the picture taken by the user with the mobile device of the user, and
determine, based on the communication, a geographic location of the mobile device of the user;
a processor-implemented item identification module configured to identify the item based on the picture of the item included in the communication; and
a processor-implemented incentive module configured to offer an incentive from at least one merchant located within a predefined distance from the geographic location of the mobile device, based on the at least one merchant having the incentive for the identified item and based on the geographic location of the mobile device.

2. The system of claim 1 wherein the processor-implemented incentive module further comprises:
a processor-implemented local merchant module configured to identify the at least one merchant within the predefined distance with at least one incentive based on the geographic location of the mobile device;
a processor-implemented incentive match module configured to determine whether the item in the picture corresponds to an item identified in the at least one incentive of the at least one merchant within the predefined distance; and
a processor-implemented communication module configured to communicate the at least one incentive from the at least one merchant within the predefined distance to the mobile device.

3. The system of claim 1 wherein the processor-implemented incentive module further comprises:
a processor-implemented item category module configured to determine a category of the item in the picture;
a processor-implemented incentive match module configured to determine whether the category of the item in the picture corresponds to a category of items identified in at least one incentive of the at least one merchant within the predefined distance; and
a processor-implemented communication module configured to communicate the at least one incentive of the identified category of items from the at least one merchant within the predefined distance to the mobile device.

4. The system of claim 1 wherein the processor-implemented incentive module further comprises:
a processor-implemented user preference module configured to request from the user whether to update a search distance preference for merchants; and
a processor-implemented local merchant module configured to identify the at least one merchant having the incentive based on the updated search distance preference.

5. The system of claim 1 wherein the processor-implemented incentive module further comprises:
a processor-implemented incentive code module configured to communicate a code associated with the at least one incentive to the mobile device, wherein the code is valid for a predetermined period of time at the corresponding merchant within the predefined distance.

6. The system of claim 1 wherein the processor-implemented location identification module further comprises:
a processor-implemented triangulation service or a global positioning service (GPS) configured to determine the location of the mobile device based on a triangulation service or a GPS service;
a processor-implemented location input module configured to determine the location of the mobile device based on a user input at the mobile device;
a processor-implemented location-dependent search term input module configured to determine the location of the mobile device based on a location-dependent search term user input at the mobile device;
a processor-implemented tag module configured to determine the location of the mobile device based on a tag from the mobile device, the tag associated with a unique geographic location.

7. The system of claim 1 wherein the processor-implemented item identification module further comprises:

a processor-implemented text identification module configured to identify the item based on a text input from the user at the geographic location of the mobile device;
a processor-implemented audio identification module configured to identify the item based on an audio input from the user at the geographic location of the mobile device;
a processor-implemented machine-readable symbol module configured to identify the item based on a machine-readable symbol scanned by the user at the geographic location of the mobile device;
a processor-implemented image identification module configured to identify the item based on an image taken by the user at the geographic location of the mobile device; and
a processor-implemented video identification module configured to identify the item based on a video taken by the user at the geographic location of the mobile device.

8. The system of claim 1 wherein the processor-implemented incentive module further comprises:
a processor-implemented user preference module configured to generate a user preference setting, the user preference setting comprising a user-defined search distance preference.

9. The system of claim 1 wherein the processor-implemented incentive module further comprises:
a processor-implemented incentive receiver module configured to receive attributes of incentives from at least one merchant within the predefined distance and store the attributes of the incentives in a database,
wherein the attributes of the incentives for an item comprises at least one of a name attribute of the merchant within the predefined distance, a name attribute of the item, a brand attribute of the item, a model attribute of the item, a category tag of the item, a sub-category tag of the item, a financial promotion attribute of the item, and a financial promotion term attribute of the item.

10. The system of claim 1 wherein the incentive comprises a coupon, a discount, or a recommendation.

11. A computer-implemented method comprising:
receiving, from a mobile device of a user, a communication that includes a picture of an item and data that pertains to a location of the mobile device of the user, the picture taken by the user with the mobile device of the user;
determining, based on the communication, a geographic location of the mobile device of the user;
identifying the item based on the picture of the item included in the communication; and
offering an incentive from at least one merchant located within a predefined distance from the geographic location of the mobile device, based on the at least one merchant having the incentive for the identified item and based on the geographic location of the mobile device.

12. The computer-implemented method of claim 11 further comprising:
identifying at least one merchant within the predefined distance with at least one incentive based on the geographic location of the mobile device;
determining whether the item in the picture corresponds to an item identified in the at least one incentive of the at least one merchant within the predefined distance; and
communicating the at least one incentive of the identified item from the at least one merchant within the predefined distance to the mobile device.

13. The computer-implemented method of claim 11 further comprising:
determining a category of the item in the picture;

determining whether the category of the item identified by the user corresponds to a category of items identified in at least one incentive of the at least one merchant within the predefined distance; and communicating the at least one incentive of the identified category of items from the at least one merchant within the predefined distance to the mobile device.

14. The computer-implemented method of claim 11 further comprising:

requesting from the user whether to update a search distance preference for merchants; and identifying the at least one merchant having the incentive based on the updated search distance preference.

15. The computer-implemented method of claim 11 further comprising:

communicating a code associated with the at least one incentive to the mobile device, wherein the code is valid for a predetermined period of time at the corresponding merchant within the predefined distance.

16. The computer-implemented method of claim 11 further comprising:

determining the geographic location of the mobile device based on at least one of a triangulation service or a global positioning service (GPS) of the mobile device, a location input from the user of the mobile device, a location-dependent search term input from the user of the mobile device, and a tag associated with a unique geographic location.

17. The computer-implemented method of claim 11 further comprising:

determining the item based on at least one of a text input from the user of the mobile device, an audio input from the user of the mobile device, a machine-readable symbol input from the user of the mobile device, an image input from the user of the mobile device, and a video input from the user of the mobile device.

18. The computer-implemented method of claim 11 wherein the incentive is generated based on a preference setting of the user of the mobile device, the preference setting comprising a user-defined search distance preference.

19. The computer-implemented method of claim 11 further comprising:

receiving attributes of incentives from at least one merchant within the predefined distance;

storing the attributes of the incentives in a database, wherein the attributes of the incentives for an item comprises at least one of a name attribute of the merchant within the predefined distance, a name attribute of the item, a brand attribute of the item, a model attribute of the item, a category tag of the item, a sub-category tag of the item, a financial promotion attribute of the item, and a financial promotion term attribute of the item.

20. The computer-implemented method of claim 11 wherein the incentive comprises a coupon, a discount, or a recommendation.

21. A non-transitory computer-readable storage medium storing a set of instructions that, when executed by a processor, causes the processor to perform operations, comprising:

receiving, from a mobile device of a user, a communication that includes a picture and data that pertains to a location of the mobile device of the user, the picture taken by the user with the mobile device of the user;

determining, based on the communication, a geographic location of the mobile device of the user;

identifying the item based on the picture of the item included in the communication; and offering an incentive from at least one merchant located within a predefined distance from the geographic location of the mobile device, based on the at least one merchant having the incentive for the identified item and based on the geographic location of the mobile device.

22. The non-transitory computer-readable storage medium of claim 21 further comprising:

identifying at least one merchant within the predefined distance with at least one incentive based on the geographic location of the mobile device;

determining whether the item in the picture corresponds to an item identified in the at least one incentive of the at least one merchant within the predefined distance; and communicating the at least one incentive of the identified item from the at least one merchant within the predefined distance to the mobile device.

23. The non-transitory computer-readable storage medium of claim 21 further comprising:

determining a category of the item in the picture;

determining whether the category of the item in the picture corresponds to a category of items identified in at least one incentive of the at least one merchant within the predefined distance; and communicating the at least one incentive of the identified category of items from the at least one merchant within the predefined distance to the mobile device.

24. The non-transitory computer-readable storage medium of claim 21 further comprising:

requesting from the user whether to update a search distance preference for merchants; and identifying the at least one merchant having the incentive based on the updated search distance preference.

25. The non-transitory computer-readable storage medium of claim 21 further comprising:

communicating a code associated with the at least one incentive to the mobile device, wherein the code is valid for a predetermined period of time at the corresponding merchant within the predefined distance.

26. The non-transitory computer-readable storage medium of claim 21 further comprising:

determining the geographic location of the mobile device based on at least one of a triangulation service or a global positioning service (GPS) of the mobile device, a location input from the user of the mobile device, a location-dependent search term input from the user of the mobile device, and a tag associated with a unique geographic location.

27. The non-transitory computer-readable storage medium of claim 21 further comprising:

determining the item based on at least one of a text input from the user of the mobile device, an audio input from the user of the mobile device, a machine-readable symbol input from the user of the mobile device, an image input from the user of the mobile device, and a video input from the user of the mobile device.

28. The non-transitory computer-readable storage medium of claim 21 wherein the incentive is generated based on a preference setting of the user of the mobile device, the preference setting comprising a user-defined search distance preference.

29. The non-transitory computer-readable storage medium of claim 21 further comprising:

receiving attributes of incentives from at least one merchant within the predefined distance;

storing the attributes of the incentives in a database, wherein the attributes of the incentives for an item comprises at least one of a name attribute of the merchant within the predefined distance, a name attribute of the item, a brand attribute of the item, a model attribute of the item, a category tag of the item, a sub-category tag of the item, a financial promotion attribute of the item, and a financial promotion term attribute of the item.

30. The non-transitory computer-readable storage medium of claim 21 wherein the incentive comprises a coupon, a discount, or a recommendation.

\* \* \* \* \*